United States Patent Office 3,180,765
Patented Apr. 27, 1965

3,180,765
PROCESS FOR PREVENTING CARBURIZATION ON FERROUS METAL SURFACES
Bruce Murray Townsend, Castle Donnington, Leicester, Eric Anthony Horbury, Loughborough, Leicester, and Ronald Parkin, Quorn, Leicester, England, assignors to Rolls-Royce Limited, Derby, England, a British company
No Drawing. Filed July 3, 1961, Ser. No. 121,308
Claims priority, application Great Britain, May 17, 1961, 121,308
4 Claims. (Cl. 148—13.1)

This invention relates to the heat treatment of metals. The term "metal" as used herein includes alloys.

This invention provides a process for carburizing ferrous metals using a gas carburizing cycle at a temperature of at least 600° C. wherein metal surfaces to be protected are, prior to carburization, coated with one or more layers of a mixture of an organophilic cation-modified clay and an organic solvent.

In addition, a binder, e.g., a silicone resin or shellac may be used as a film stiffener.

Although conventional techniques, such as brushing and dipping may be used for applying the coating, it is preferred to apply the coating in a series of thin layers by spraying the coating on the metal surface, each spray coating being thoroughly dried in air before application of a further coating.

The term "organophilic cation-modified clay" as used herein means a clay modified by covering the greater part of the surface of the particles of the clay with alkyl or aryl organic radicals coupled to the clay ionically by means of an onium base.

An onium compound has been defined in Hackh's Chemical Dictionary—Second Edition—as "A group of organic compounds of the type RXHy which are isologs of ammonium and contain the element X in its highest positive valency; where X is pentavalent as in ammonium, phosphonium, arsonium and stibonium; where X is tetravalent as in oxonium, sulphonium, selenonium and stannonium compounds and, where X is trivalent, as in iodonium compounds."

They may be considered as addition compounds, this being further described under the heading of oxonium, carbonium, stibonium, -inium, -ylium.

The cation-modified clay may be produced for example by converting the organic bases to the salts formed by the addition of an acid such as hydrochloric or acetic acid dissolved in water, and adding the selected onium compound to an aqueous clay dispersion.

The term "clay" as used herein includes montmorillonite, that is, sodium, potassium, lithium and other bentonites, particularly those of the Wyoming and South Dakota (U.S.A.) types, magnesium bentonite sometimes called hectorite and saponite, nentronite and like synthetic base exchange materials.

Details of the preparation of organophilic cation-modified clays are given in British Patents Nos. 664,830 and 782,724 and U.S.A. Patent No. 2,531,444.

Examples of organophilic clays which may be used are dimethyldioctadecyl ammonium montmorillonite, dodecylamine montmorillonite and dimethyldioctadecyl ammonium hectorite. These organophilic clays may be dispersed in one or more liquid organic media. Examples of liquid organic media which may be used are highly polar liquids such as aliphatic alcohols including monohydric alcohols such as methanol, ethanol and propanol; aliphatic esters including ethyl acetate, butyl acetate and amyl acetate; and aliphatic ketones including acetone, methyl ethyl ketone and methyl isobutyl ketone; less polar liquids such as dibutyl phthalates, polyesters, polyamides and alkyl resins; and slightly polar liquids such as aromatic hydrocarbons including benzene, toluene, para and meta xylenes, naphtha, turpentine and dipentene; mineral oils and mineral spirits such as white spirit; and aliphatic hydrocarbons such as hexane and heptane.

The metal surfaces to be treated may be degreased, if necessary, first by paraffin washing if particularly greasy and then by a trichlorethylene vapour degreasing process to remove organic materials and any paint present may be removed by a paint stripper such as methylene chloride. Liquid organic media which are particularly useful because of their non-inflammable properties are halogenated aliphatic hydrocarbons such as trichlorethylene and perchlorethylene. Under suitable circumstances it has been found possible to use aqueous emulsions of the organophilic clays.

After the carburizing treatment any scale present may be removed in the case of stainless steel by spraying with high pressure water followed by immersion in concentrated hydrochloric acid and washing with water.

In the case of mild steel the scale may be removed by immersion in inhibited concentrated hydrochloric acid and followed by washing in water. Alternatively in each case the scale may be removed by abrasive cleaning.

The following examples, in which the parts are by weight except where otherwise stated, illustrate the invention.

*Example 1*

100 gms. of dimethyldioctadecyl ammonium montmorillonite of the grade sold as Bentone 34, the word "Bentone" being a registered trademark, were milled with 5 gms. of an oil-soluble dye, added as a witness of coverage, and 1,000 mls. of toluene in a stainless steel ball mill using stainless steel balls for four hours. This mixture was diluted with 1,000 mls. of toluene and again milled for half-an-hour. The resultant mixture was then diluted with toluene until it was in the proportion of 20 gms. per litre of Bentone 34 in toluene.

A sheet of S 82 carburizing steel was subjected to carburizing using the following steps:

(1) Any paint on the surface was removed by wire brushing.

(2) Any organic materials were removed by trichlorethylene vapour degreasing.

(3) The surfaces of the sheet were sprayed with a coating of the Bentone 34 in toluene prepared as described above. The coating was allowed to dry in air for ten minutes.

(4) A second coating of the Bentone in toluene was then sprayed on to the surface and allowed to dry in air.

(5) The metal sheet was then placed in a carburizing furnace and was brought up to 905° C., which took about one hour. The metal was held at 905° C. for 13½ hours and then allowed to cool in the furnace before removal. This took two hours.

(6) To remove that part of the Bentone 34 which had not flaked off during cooling the metal surface was sand-blasted. The carburizing furnace was provided with a carburizing atmosphere by using a commercially available liquid containing isopropanol and methane.

*Example 2*

Example 1 was repeated but using instead of the Bentone 34 in toluene a mixture prepared by mixing 3 parts of Bentone 34 with 100 parts of xylene to form a gel and then adding 50 parts of water with stirring to the gel, followed by passing through a colloid mill.

Example 3

Example 2 was repeated but using 100 parts of solvent naphtha intsead of the xylene.

Example 4

Example 2 was repeated but using 100 parts of white spirit instead of the xylene.

Example 5

Example 1 was repeated but using instead of the Bentone 34 in toluene a mixture prepared by mixing 3 parts of dimethyldioctadecyl ammonium hectorite of the grade sold as Bentone 38 with 100 parts of toluene and 1.5 parts of ethanol to form a gel and then adding 50 parts of water with stirring to the gel followed by passing through a colloid mill.

Example 6

Example 1 was repeated using instead of S 82 the following carburizing steels EN 33, EN 36, S 40 and S 90 with similar results.

In each of the above Examples 1 to 6 the protective coating, by preventing carburization, allows areas of articles to be masked from the carburizing atmosphere thus giving areas where carburizing has not taken place.

The above examples were repeated but using instead of the Bentone 34, dodecyl montmorillonite (sold under the registered trademark Bentone 18C) and dimethyldioctadecyl ammonium hectorite (sold under the registered trademark Bentone 38) and similar results were obtained.

We claim:
1. A process for carburizing ferrous metals in which part of the ferrous metal is protected against carburization which comprises coating that part of the surface of the ferrous metal which is to be protected with a coating of at least one layer of a sprayable coating composition of an organophilic cation-modified clay and an organic solvent, drying the coated surfaces to deposit on said part a film of the organophilic cation-modified clay and carburizing the unprotected metal surfaces by heating to a temperature of at least 600° C.
2. A process for carburizing ferrous metals according to claim 1 wherein the heating is carried out at a temperature of about 900° C.
3. A process for carburizing ferrous metals according to claim 1 wherein the sprayable coating composition includes a film-stiffening binder.
4. A process for carburizing ferrous metals according to claim 1 wherein the organophilic cation-modified clay is dimethyldioctadecyl ammonium montmorillonite.

References Cited by the Examiner
UNITED STATES PATENTS

| | | | |
|---|---|---|---|
| 2,124,446 | 7/38 | Detwiler | 148—14 |
| 2,531,440 | 11/50 | Jordan | 252—51.5 |
| 2,861,020 | 11/58 | Mills | 148—20.6 |
| 2,898,253 | 8/59 | Schneider et al. | 148—20.6 |
| 3,037,878 | 6/62 | Cowles et al. | 148—13.1 |

DAVID L. RECK, *Primary Examiner.*

MARCUS U. LYONS, *Examiner.*